UNITED STATES PATENT OFFICE.

JACOB D. MILLER, OF YORK, PENNSYLVANIA, ASSIGNOR OF ONE-HALF TO REUBEN R. KAYLER, OF SAME PLACE.

TREATING TOBACCO-LEAF.

SPECIFICATION forming part of Letters Patent No. 254,999, dated March 14, 1882.

Application filed December 9, 1881. (No specimens.)

*To all whom it may concern:*

Be it known that I, JACOB D. MILLER, a citizen of the United States, and a resident of York, York county, Pennsylvania, have invented certain Improvements in Treating Tobacco-Leaf, of which the following is a full, clear, and exact description.

My invention consists in removing the white veins and fox-marks found in many grades of tobacco-leaf, and the presence of which seriously impairs the quality of the tobacco, rendering it unserviceable for cigar-wrappers, except in articles of a very inferior grade.

Many efforts have been made from time to time to eradicate or remove what are called "fox-marks" and "white veins;" but so far as I am aware no process has ever proved successful in the treatment of the leaf before applying the same as a wrapper for a cigar. The wrappers, after application to the filling, have sometimes been stained; but this mode is objectionable because of the expense and because it is impossible to determine until after the goods are made up whether the leaf will be benefited by the stain.

I have discovered, after many experiments, that carbon-black combined with a suitable liquid vehicle and applied to the leaf before the latter is resweated will impart to the leaf a rich color, and will completely, or to a great extent, eradicate the fox-marks and white veins without in the least impairing the quality of the leaf. I use the carbon-black in various forms—as stone-coal, lamp-black, bone-black, &c.—and I prefer to employ therewith as a liquid vehicle vinegar or acetic acid and water. The proportions may vary; but I have found that one pound of finely-pulverized stone-coal and one gallon of vinegar and water will be very effective. To these ingredients I sometimes add a little ammonia—say one ounce—and when the marks in the leaf are very white and numerous I have found it advantageous to use, in addition to the other ingredients, from one to three ounces of aniline-black to an ounce of logwood and one ounce of copperas, with one pint of alcohol. By the combination of these ingredients I have made a mixture which has proved most effective in imparting a rich, even color to white-veined and foxy leaves of the most inferior quality.

Without confining myself to the proportions above stated, I claim—

1. The mode above described of treating leaf-tobacco to remove the white veins and fox-marks, the same consisting in applying to the leaf carbon-black in a suitable liquid vehicle, and then resweating the leaf, substantially as set forth.

2. The mixture for treating white veined and fox-marked tobacco-leaves, consisting of carbon-black and vinegar, as specified.

In testimony whereof I have signed my name to this specification in the presence of two subscribing witnesses.

J. D. MILLER.

Witnesses:
CHARLES E. FOSTER,
A. E. T. HANSMANN.